US012671708B2

(12) United States Patent
Gibbons et al.

(10) Patent No.: US 12,671,708 B2
(45) Date of Patent: Jun. 30, 2026

(54) ENCRYPTED INTERSTITIAL TECHNIQUES FOR WEB SECURITY

(71) Applicant: F5, Inc., Seattle, WA (US)

(72) Inventors: Kevin Gibbons, Sunnyvale, CA (US); Madhukar Nagaraja Kedlaya, Fremont, CA (US); Claire Madison Schlenker, San Francisco, CA (US); Timothy Disney, Pacifica, CA (US); Nitish Kishore Khadke, Mountain View, CA (US)

(73) Assignee: F5, Inc., Seattle, WA (US)

( * ) Notice: Subject to any disclaimer, the term of this patent is extended or adjusted under 35 U.S.C. 154(b) by 93 days.

(21) Appl. No.: 18/648,754

(22) Filed: Apr. 29, 2024

(65) Prior Publication Data

US 2025/0294042 A1      Sep. 18, 2025

Related U.S. Application Data

(60) Provisional application No. 63/462,903, filed on Apr. 28, 2023.

(51) Int. Cl.
*H04L 9/40*      (2022.01)
*G06F 21/12*      (2013.01)

(52) U.S. Cl.
CPC ...... *H04L 63/1425* (2013.01); *H04L 63/0435* (2013.01); *H04L 63/1441* (2013.01)

(58) Field of Classification Search
CPC ............. H04L 63/1425; H04L 63/0435; H04L 63/1441
See application file for complete search history.

(56) References Cited

U.S. PATENT DOCUMENTS

| | | |
|---|---|---|
| 3,255,845 A | 6/1966 | Gardner |
| 8,112,471 B2 | 2/2012 | Wei |

(Continued)

FOREIGN PATENT DOCUMENTS

| | | |
|---|---|---|
| EP | 3255845 A1 | 12/2017 |
| WO | 2017144123 A1 | 8/2017 |
| WO | 20230117367 A1 | 6/2023 |

OTHER PUBLICATIONS

Tripathi et al., "Protected resource access for mobile agent-based distributed computing," Proceedings of the 1998 ICPP Workshop on Architectural and OS Support for Multimedia Applications Flexible Communication Systems. Wireless Networks and Mobile Computing (Cat. No. 98EX206) Year: 1998 | Conference Paper | Publ.*

(Continued)

*Primary Examiner* — Roderick Tolentino

(74) *Attorney, Agent, or Firm* — Troutman Pepper Locke LLP

(57)      ABSTRACT

A method, non-transitory computer readable medium, device and system intercepts a request for a webpage including a protected resource. The request is sent from a client device to a server device. One or more link tags or other mechanisms corresponding to one or more sub-resources included in the webpage are generated. The webpage is encrypted. An interstitial page is served to the client device that includes an encrypted portion that includes the encrypted webpage, an unencrypted portion that includes the link tags, and instrumentation code that collects telemetry data when executed at the client device. The telemetry data is received from the client device and a threat analysis is performed on the telemetry data. A decryption key is transmitted to the client device in response to determining that the request is allowed, based on the performed threat (Continued)

analysis. The decryption key allows the client device to decrypt the encrypted webpage.

20 Claims, 4 Drawing Sheets

(56) References Cited

U.S. PATENT DOCUMENTS

| | | | | |
|---|---|---|---|---|
| 8,458,353 | B2 | 6/2013 | Krishnaswamy | |
| 9,172,756 | B2 | 10/2015 | Ramachandran | |
| 9,674,054 | B2 | 6/2017 | Scharf | |
| 10,143,001 | B2 | 11/2018 | Schliwa-Bertling | |
| 10,476,992 | B1 | 11/2019 | Amdahl | |
| 10,554,793 | B2 | 2/2020 | Roeland | |
| 10,757,146 | B2 | 8/2020 | Annamalaisami | |
| 11,272,250 | B1 * | 3/2022 | Buchner | H04N 7/15 |
| 11,302,020 | B2 | 4/2022 | Matsuo | |
| 11,570,239 | B2 | 1/2023 | Desmouceaux | |
| 11,647,036 | B1 * | 5/2023 | Disney | H04L 63/1416 |
| | | | | 726/23 |
| 11,783,087 | B1 * | 10/2023 | Agarwal | H04L 63/083 |
| | | | | 726/26 |
| 2002/0143892 | A1 | 10/2002 | Mogul | |
| 2004/0032340 | A1 * | 2/2004 | Lingafeldt | H04M 11/002 |
| | | | | 379/106.01 |
| 2007/0071233 | A1 | 3/2007 | Zak | |
| 2007/0147258 | A1 | 6/2007 | Mottishaw | |
| 2007/0206620 | A1 | 9/2007 | Cortes | |
| 2009/0180477 | A1 | 7/2009 | Akahane | |
| 2010/0290468 | A1 | 11/2010 | Lynam | |
| 2014/0040451 | A1 | 2/2014 | Agrawal | |
| 2015/0230274 | A1 | 8/2015 | Sharma | |
| 2016/0140045 | A1 | 5/2016 | Bergeron | |
| 2016/0142438 | A1 | 5/2016 | Pastore | |
| 2017/0144123 | A1 | 5/2017 | Tabeling | |
| 2017/0195427 | A1 | 7/2017 | Choquette | |
| 2017/0317920 | A1 | 11/2017 | Rocquelay | |
| 2017/0373953 | A1 | 12/2017 | George | |
| 2018/0041524 | A1 | 2/2018 | Reddy | |
| 2018/0062979 | A1 | 3/2018 | Zee | |
| 2018/0189471 | A1 * | 7/2018 | Paluri | G06F 21/36 |
| 2018/0248714 | A1 | 8/2018 | Milescu | |
| 2019/0068694 | A1 | 2/2019 | Ripke | |
| 2019/0182363 | A1 | 6/2019 | Bonaventure | |
| 2019/0182367 | A1 | 6/2019 | Kim | |
| 2019/0297058 | A1 * | 9/2019 | Ragusa | H04L 63/065 |
| 2019/0372937 | A1 | 12/2019 | Song | |
| 2020/0177592 | A1 | 6/2020 | Idika | |
| 2020/0287924 | A1 * | 9/2020 | Zhang | H04L 63/1425 |
| 2020/0314615 | A1 | 10/2020 | Patil | |
| 2020/0396267 | A1 | 12/2020 | Petria | |
| 2021/0022041 | A1 | 1/2021 | Allan | |
| 2021/0204200 | A1 | 7/2021 | Krishan | |
| 2022/0060547 | A1 | 2/2022 | Krishan | |
| 2022/0070648 | A1 | 3/2022 | Krishan | |
| 2022/0200851 | A1 | 6/2022 | Smith | |
| 2023/0110131 | A1 | 4/2023 | Smith | |
| 2024/0114012 | A1 * | 4/2024 | Venkatesan | H04L 63/107 |
| 2024/0118689 | A1 * | 4/2024 | Jobanputra | G05D 1/226 |
| 2025/0156545 | A1 * | 5/2025 | Yifrach | G06F 21/85 |

OTHER PUBLICATIONS

Inagaki et al., "Shared-Resource Management Using Online Social-Relationship Metric for Altruistic Device Sharing," IEEE Access Year: 2018 | vol. 6 | Journal Article | Publisher: IEEE.*

European Search Report Dated Feb. 27, 2025. European Application No. EP 24 20 2428.9.

European Search Report for EP Application No. 24193940.4, dated Oct. 30, 2024.

European Search Report dated Sep. 18, 2024. European Application No. 24173105.8.

F5 Networks, Release Notes: BIG-IP 11.5.0 L TM and TMOS Release Notes, available at: https://techdocs.f5.com/kb/n-us/products/big-ip_ltm/releasenotes/producl/relnoteltm-11-5-0.html#rn_new, Mar. 18, 2018.

Ford et al., Request for Comments: 6824, TCP Extensions for Multipath Operation with Multiple Addresses, available at: https://tools.ielf.org/pdf/rfc6824. pdf, Jan. 2013.

Scharf et al., Request for Comments: 6897, Multipath TCP (MPTCP) Application Interface Considerations, available at: https://www.rfc-editor.org/rfc/pdfrfc/rfc6897. lxt. pdf, Mar. 2013.

Extended European Search Report, dated Mar. 25, 2022.

F5—Simplify and Secure 5G Core Signaling https ://www. f5. co mi prod u cts/big-i p-se 1vlces/se rvice-co mmu n Icati on-proxy downloaded Sep. 27, 2023.

F5—Secure 5G Roaming and Network Interconnection https ://www. f5. com/ prod u cts/big-i p-se 1vices/secu rity-edg e-protection-proxy downloaded Sep. 27, 2023.

Oracle Communications—Cloud Native Core; Licensing Information user Manual; Release 2.0.0; F22873-01 (Sep. 2019) https:// docs.oracle .com/cd/F22976. _ 01 /docs. 10 /L.icensin~i% 20Manual .pdf downloaded Sep. 29, 2023.

Cisco—Ultra Cloud Core 5G Session Management Function, Release 2021 .01—Configuration and Administration Guide—Wreless Priority Guide https :i /www.cisco.com/c/en/us/td/docs/wi reiesstucc/ smf/2021-01-0/SMF Config_Ad mi n/b ucc-5g-smf-config-and-admin-guide. _2021-01 im _wireless-priority-services. html Updated Feb. 12, 2021; downloaded Sep. 27, 2023.

M. Tllomson, et al.; internet Engineering Task Force (IETF); RFC 91.13-HTTP/2, section 5.3 https://datatracker.ietLorg/docihtml/ rfc9113#section-5.3 Published Jun. 2022 (ISSN: 2070-1721) downloaded Sep. 27, 2023.

ETSI TS 128 500 V17.8.0 (Oct. 2022) Technical Specification; 5G System; Tec:tmical Realization of Sew1vice Based Architecture: Stage 3 (3GPP TS29.500 version 17.8.0 Release 17) https :l /portal .etsi .orgtweba pp/workprog rn m/ Report_Workltem. asp\I\IK I_1 0=67084 downloaded Sep. 29, 2023.

* cited by examiner

100

150

BROWSER APPLICATION 106

CLIENT COMPUTING DEVICE 102

WEB CONTENT 122

WEB SERVER SYSTEM 112

INSTRUMENTATION CODE COMPONENT 132

TELEMETRY PROCESSING COMPONENT 134

INTERSTITIAL PAGE CREATION COMPONENT 136

TELEMETRY DATABASE COMPONENT 138

SECURITY SERVER SYSTEM 140

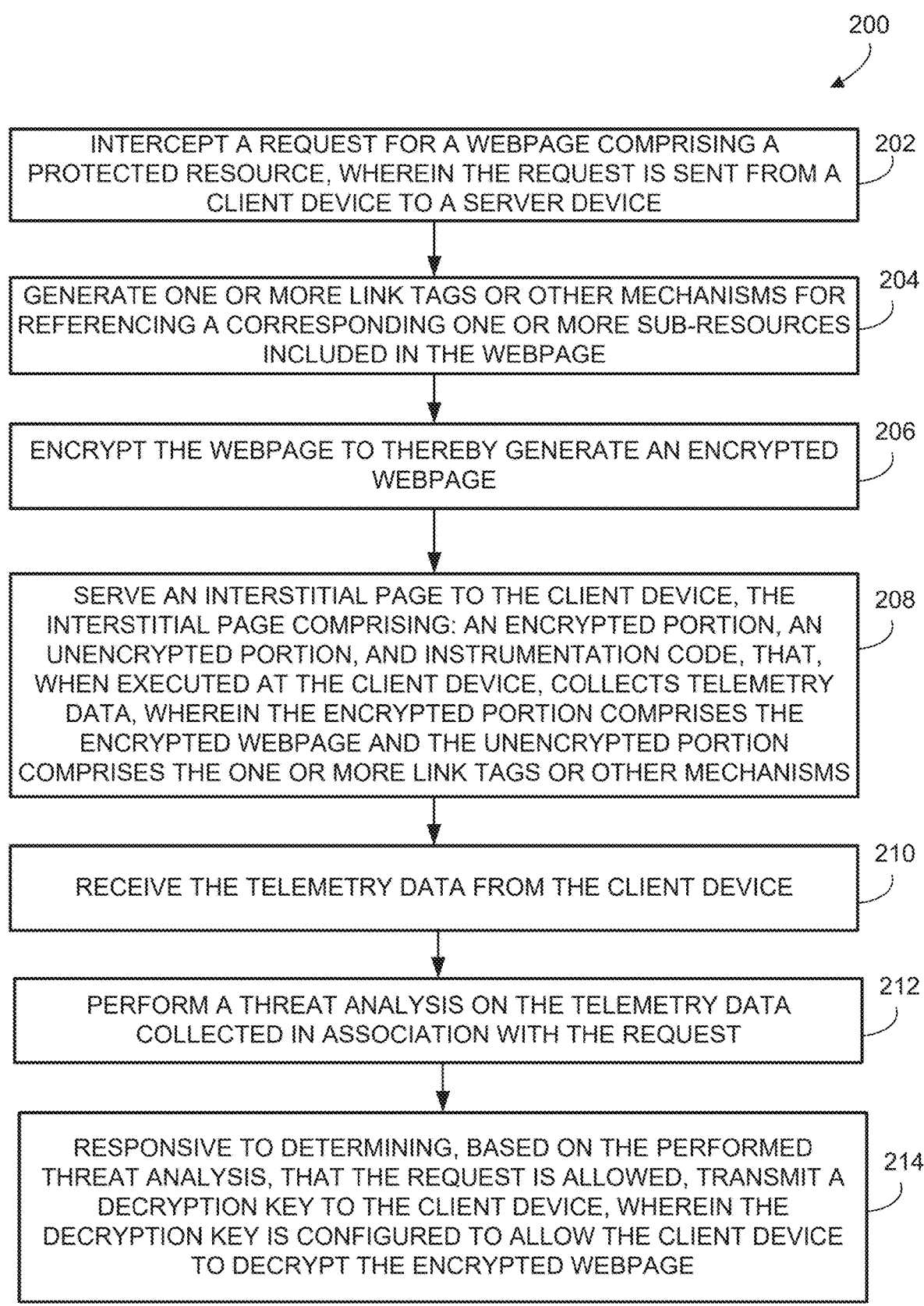

200

INTERCEPT A REQUEST FOR A WEBPAGE COMPRISING A PROTECTED RESOURCE, WHEREIN THE REQUEST IS SENT FROM A CLIENT DEVICE TO A SERVER DEVICE ⟩202

GENERATE ONE OR MORE LINK TAGS OR OTHER MECHANISMS FOR REFERENCING A CORRESPONDING ONE OR MORE SUB-RESOURCES INCLUDED IN THE WEBPAGE ⟩204

ENCRYPT THE WEBPAGE TO THEREBY GENERATE AN ENCRYPTED WEBPAGE ⟩206

SERVE AN INTERSTITIAL PAGE TO THE CLIENT DEVICE, THE INTERSTITIAL PAGE COMPRISING: AN ENCRYPTED PORTION, AN UNENCRYPTED PORTION, AND INSTRUMENTATION CODE, THAT, WHEN EXECUTED AT THE CLIENT DEVICE, COLLECTS TELEMETRY DATA, WHEREIN THE ENCRYPTED PORTION COMPRISES THE ENCRYPTED WEBPAGE AND THE UNENCRYPTED PORTION COMPRISES THE ONE OR MORE LINK TAGS OR OTHER MECHANISMS ⟩208

RECEIVE THE TELEMETRY DATA FROM THE CLIENT DEVICE ⟩210

PERFORM A THREAT ANALYSIS ON THE TELEMETRY DATA COLLECTED IN ASSOCIATION WITH THE REQUEST ⟩212

RESPONSIVE TO DETERMINING, BASED ON THE PERFORMED THREAT ANALYSIS, THAT THE REQUEST IS ALLOWED, TRANSMIT A DECRYPTION KEY TO THE CLIENT DEVICE, WHEREIN THE DECRYPTION KEY IS CONFIGURED TO ALLOW THE CLIENT DEVICE TO DECRYPT THE ENCRYPTED WEBPAGE ⟩214

FIG. 2

ENCRYPTED INTERSTITIAL TECHNIQUES FOR WEB SECURITY

CROSS-REFERENCE TO RELATED APPLICATION(S)

This application claims priority to U.S. Provisional Application No. 63/462,903, filed on Apr. 28, 2023, which is hereby incorporated herein by reference in its entirety.

FIELD

This technology generally relates to security techniques applicable to client and server systems and, more specifically, to encrypted interstitial techniques for web security.

BACKGROUND

Web and mobile applications and application programming interface (API) endpoints are being subjected to a growing number of sophisticated automation attacks resulting in large scale instances of fraud. This unwanted or malicious automation traffic to web and mobile applications can be perpetrated, by way of example, by: a) criminals looking to steal money or other value; or b) by businesses who want to appropriate another company's data to drive their own businesses. In particular, businesses misappropriating a company's website data are often labeled "scrapers" because they "scrape" inventory, pricing and catalog data off of public websites. By doing this, scrapers can disrupt user experiences for legitimate human traffic and dramatically increase a website's operating costs. Website owners generally lack visibility into the scale of their scraping problem as well as the tools to manage and, when necessary, prevent or limit scraping. However, the size and scale of the problem with criminals and scrapers is breathtaking. Between about 50% and 90% of traffic to websites is malicious or unwanted automation traffic.

Unfortunately, blocking fraudulent or unwanted automation traffic, while permitting legitimate human sessions to proceed without user friction is very challenging. To websites and mobile applications, attackers may appear virtually identical to genuine users by, for example, hijacking their devices, simulating human behavior, and leveraging stolen identities. Additionally, these attackers are rapidly evolving tools and methods to perpetrate this fraud, making it harder for applications or even humans to tell the difference between real and fake users. One approach may be to place all sensitive resources behind an authentication flow by, for example, requiring a user to login to a website with a username and password corresponding to their user account before being able to access the resource, but this approach does not work for applications that do not involve the user of user accounts.

Historically, the industry's typical approach to managing scraping attacks has been to serve a challenge to deter scraper bots from obtaining access to valuable resources. CAPTCHA is one example challenge that is often presented to stop unwanted scraping. CAPTCHA worked for a time, but scrapers have now learned how to technically bypass it, resulting in it being ineffective at limiting unwanted or aggressive scraping. In other words, the industry response to managing scraper traffic is both ineffective (e.g., scrapers can easily bypass challenges such as CAPTCHA), and it introduces painful friction for legitimate human traffic such as trying to solve challenges provided by CAPTCHAs.

One technique for addressing these problems is use of an interstitial page, which loads a substantially blank page while a script gathers information about the browser environment that is used to make a determination regarding whether the browser should be allowed to access the requested resource (e.g., by determining whether the browser is being operated by an automated web scraper or a human user), and then loading the requested resource upon determining that access should be granted. However, while use of an interstitial page can be effective at preventing unwanted web scraper attacks, this technique may also create an undesirable delay with the loading of the requested resource because the user must wait for multiple additional network requests to complete before being able to access the resource.

Accordingly, there are ongoing attempts to address these issues, but these attempts have had limited degrees of success and often cause undue friction or delay for end users resulting in undesirable decreases in usage and/or incomplete transactions for web content providers.

SUMMARY

A method implemented by a security server system (including, for example, one or more security server apparatuses, server devices, or client devices) includes intercepting a request for a webpage including a protected resource. The request may be sent from a client device to a server device. One or more link tags or other mechanisms corresponding to one or more sub-resources included in the webpage are generated. The webpage is encrypted. An interstitial page is served to the client that includes an encrypted portion, an unencrypted portion, and instrumentation code that when executed at the client device, collects telemetry data. The encrypted portion includes the encrypted webpage and the unencrypted portion includes the one or more link tags or other mechanisms. Telemetry data is received from the client device and a threat analysis is performed on the telemetry data collected in association with the request. A decryption key is transmitted to the client device in response to determining that the request is allowed based on the performed threat analysis. The decryption key is configured to allow the client device to decrypt the encrypted webpage.

In any of the examples disclosed herein, the generating of one or more link tags or other mechanisms for referencing a corresponding one or more sub-resources included in the webpage includes: scanning HTML code of the webpage to identify one or more sub-resource tags; and for each identified sub-resource tag, generating a link tag that is associated with a preload attribute.

In any of the examples disclosed herein, the unencrypted portion including the one or more link tags or other mechanisms is configured to allow the client device to download the corresponding one or more sub-resources to a cache of the client device while the telemetry data is being collected and the threat analysis is being performed.

In any of the examples disclosed herein, the method further includes responsive to determining, based on the performed threat analysis, that the request is denied, performing a mitigating action with respect to the request.

In any of the examples disclosed herein, the encrypting of the webpage is performed using symmetric key encryption.

A security server device includes a memory including programmed instructions stored thereon, and one or more processors coupled to the memory and configured to execute the stored programmed instructions to: intercept a request for a webpage including a protected resource, wherein the request is sent from a client device to a server device; generate one or more link tags or other mechanisms for referencing a corresponding one or more sub-resources included in the webpage; encrypt the webpage to thereby generate an encrypted webpage; serve an interstitial page to the client device; receive the telemetry data from the client device; perform a threat analysis on the telemetry data collected in association with the request; and responsive to determining, based on the performed threat analysis, that the request is allowed, transmit a decryption key to the client device, wherein the decryption key is configured to allow the client device to decrypt the encrypted webpage. The interstitial page includes: an encrypted portion including the encrypted webpage; an unencrypted portion including the one or more link tags or other mechanisms; and instrumentation code that, when executed at the client device, collects telemetry data.

In any of the examples disclosed herein, for the generating of one or more link tags or other mechanisms for referencing a corresponding one or more sub-resources included in the webpage, the one or more processors are further configured to execute the stored programmed instructions to: scan HTML code of the webpage to identify one or more sub-resource tags; and for each identified sub-resource tag, generate a link tag that is associated with a preload attribute.

In any of the examples disclosed herein, the unencrypted portion including the one or more link tags or other mechanisms is configured to allow the client device to download the corresponding one or more sub-resources to a cache of the client device while the telemetry data is being collected and the threat analysis is being performed.

In any of the examples disclosed herein, the one or more processors are further configured to execute the stored programmed instructions to: responsive to determining, based on the performed threat analysis, that the request is denied, perform a mitigating action with respect to the request.

In any of the examples disclosed herein, the webpage is encrypted using symmetric key encryption.

A non-transitory computer readable medium having stored thereon instructions including executable code that, when executed by one or more processors, causes the one or more processors to: intercept a request for a webpage including a protected resource, wherein the request is sent from a client device to a server device; generate one or more link tags or other mechanisms for referencing a corresponding one or more sub-resources included in the webpage; encrypt the webpage to thereby generate an encrypted webpage; serve an interstitial page to the client device; receive the telemetry data from the client device; perform a threat analysis on the telemetry data collected in association with the request; and responsive to determining, based on the performed threat analysis, that the request is allowed, transmit a decryption key to the client device, wherein the decryption key is configured to allow the client device to decrypt the encrypted webpage. The interstitial page includes: an encrypted portion including the encrypted webpage; an unencrypted portion including the one or more link tags or other mechanisms; and instrumentation code that, when executed at the client device, collects telemetry data.

In any of the examples disclosed herein, for the generating of one or more link tags or other mechanisms for referencing a corresponding one or more sub-resources included in the webpage, the executable code, when executed by the one or more processors, further causes the one or more processors to: scan HTML code of the webpage to identify one or more sub-resource tags; and for each identified sub-resource tag, generate a link tag that is associated with a preload attribute.

In any of the examples disclosed herein, the unencrypted portion including the one or more link tags or other mechanisms is configured to allow the client device to download the corresponding one or more sub-resources to a cache of the client device while the telemetry data is being collected and the threat analysis is being performed.

In any of the examples disclosed herein, the executable code, when executed by the one or more processors further causes the one or more processors to: responsive to determining, based on the performed threat analysis, that the request is denied, perform a mitigating action with respect to the request.

In any of the examples disclosed herein, the webpage is encrypted using symmetric key encryption.

A security system including one or more security server apparatuses, server devices, or client devices with memory including programmed instructions stored thereon and one or more processors coupled to the memory and configured to execute the stored programmed instructions to: intercept a request for a webpage including a protected resource, wherein the request is sent from a client device to a server device; generate one or more link tags or other mechanisms for referencing a corresponding one or more sub-resources included in the webpage; encrypt the webpage to thereby generate an encrypted webpage; serve an interstitial page to the client device; receive the telemetry data from the client device; perform a threat analysis on the telemetry data collected in association with the request; and responsive to determining, based on the performed threat analysis, that the request is allowed, transmit a decryption key to the client device, wherein the decryption key is configured to allow the client device to decrypt the encrypted webpage. The interstitial page includes: an encrypted portion including the encrypted webpage; an unencrypted portion including the one or more link tags or other mechanisms; and instrumentation code that, when executed at the client device, collects telemetry data.

In any of the examples disclosed herein, for the generating of one or more link tags or other mechanisms for referencing a corresponding one or more sub-resources included in the webpage, the one or more processors are further configured to execute the stored programmed instructions to: scan HTML code of the webpage to identify one or more sub-resource tags; and for each identified sub-resource tag, generate a link tag that is associated with a preload attribute.

In any of the examples disclosed herein, the unencrypted portion including the one or more link tags or other mechanisms is configured to allow the client device to download the corresponding one or more sub-resources to a cache of the client device while the telemetry data is being collected and the threat analysis is being performed.

In any of the examples disclosed herein, the one or more processors are further configured to be capable of executing the stored programmed instructions to: responsive to determining, based on the performed threat analysis, that the request is denied, perform a mitigating action with respect to the request.

In any of the examples disclosed herein, the webpage is encrypted using symmetric key encryption.

This technology provides a number of advantages including providing methods, non-transitory computer readable media, devices and systems that provide encrypted interstitial techniques for effective web security. Use of interstitial techniques can allow a web content provider to have effective web security while still reducing user friction for legitimate users. When friction in using a web system is too great, it may cause negative impacts such as decreased usage and/or incomplete transactions. Use of encrypted interstitial techniques, as disclosed herein, can eliminate or reduce friction more than previously disclosed interstitial techniques by enabling a client device to begin downloading sub-resources into its cache and downloading an encrypted copy of the requested webpage while the system collects telemetry data and performs a threat analysis on the telemetry data to determine whether the client should be allowed to access the requested webpage. In other words, by the time the threat analysis has been completed and the system has determined that access to the webpage should be granted to the client device, the client device will have already completed downloading some or all of the encrypted webpage HTML and sub-resources so that it can immediately load and render the webpage upon being granted authorization (e.g., after the client device receives a decryption key). Thus, the processes of the collection of telemetry data, performing a threat analysis, and decrypting the encrypted HTML page collectively can take less time than a conventional loading of the website would take, and the user will experience little or no additional delay in loading a webpage beyond what an unprotected system would provide. In other words, use of the encrypted interstitial techniques described herein can greatly reduce, if not entirely eliminate, any excess delay in rendering a protected resource (e.g., a webpage) on the client device attributable to the use of a web security system while still providing security benefits of blocking unwanted automated traffic.

Additionally, with examples of this technology, a web content provider may better protect its users and itself from fraudsters and these security features may be provided relatively simply for the web content providers with minimal modification by the web content provider to hardware or software on its own server systems. Further, with examples of this technology a security code and/or system can be provided flexibly by an organization that specializes in web security, which can in turn keep the security code updated to address ever-changing security threats. With these examples, such a security organization can also aggregate data received across many entities that operate many domains, including telemetry data and/or analyzed telemetry data and can use the aggregated data to generate countermeasures that are more effective than countermeasures that could be developed using only data from a single domain. Additional features and advantages are apparent by way of the examples of the technology illustrated and described herein.

BRIEF DESCRIPTION OF THE DRAWINGS

The following detailed description of specific examples of the disclosure will be better understood when read in conjunction with the appended drawings. For the purpose of illustrating the disclosure, specific example examples are shown in the drawings. It should be understood, however, that the disclosure is not limited to the precise arrangements and instrumentalities of the example examples shown in the drawings.

FIG. 2 is a flowchart of an example of a method using encrypted interstitial techniques for web security.

DETAILED DESCRIPTION

Figure 1:
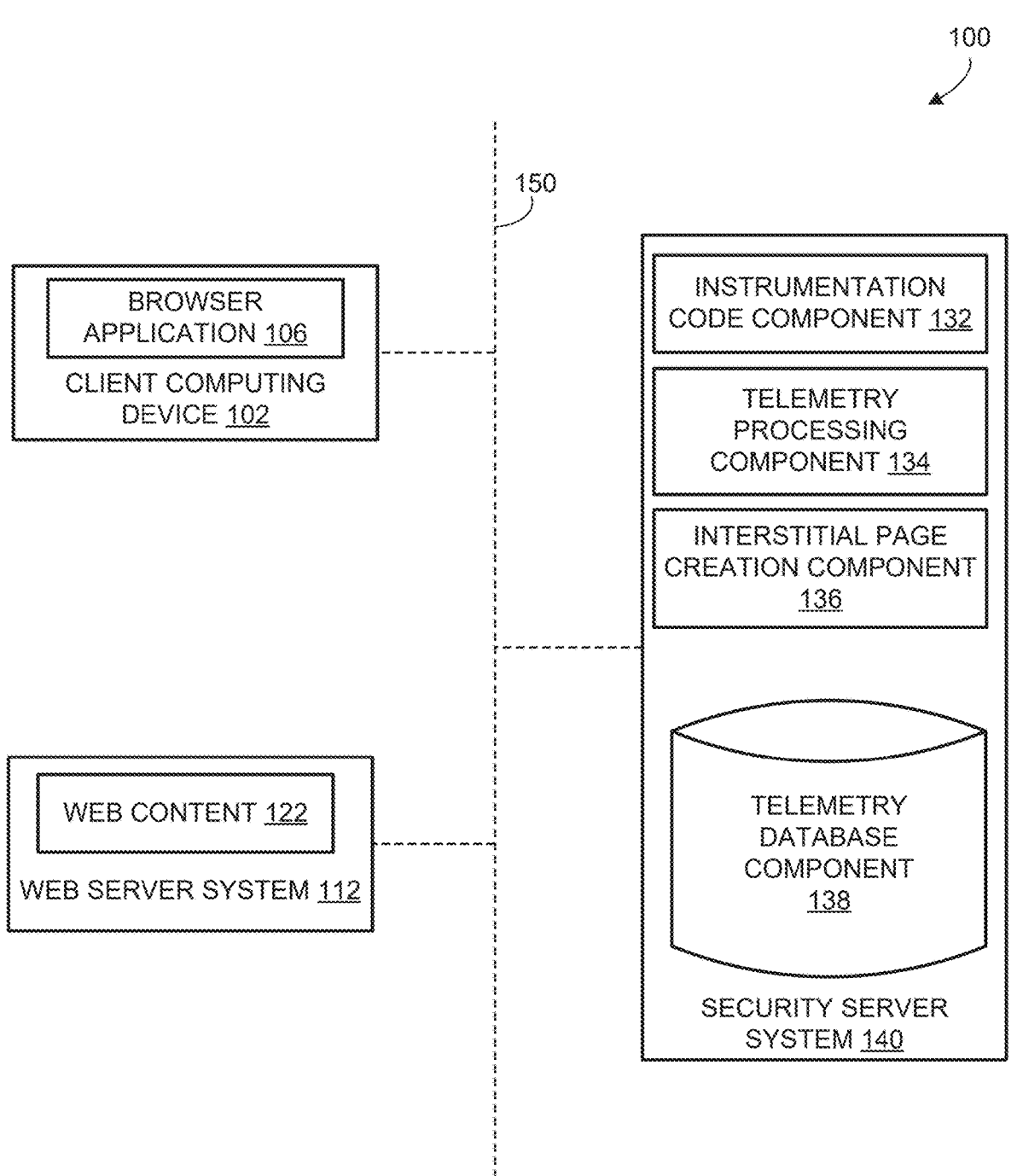
FIG. 1 is a block diagram of an example of a security system that includes a security server system.

In the following exemplary description, for the purpose of explanation, numerous specific details are set forth in order to provide a thorough understanding of examples of this technology. It will be apparent, however, that examples of this technology may be practiced without these specific details. In other instances, well-known structures and devices are shown in block diagram form in order to avoid unnecessarily obscuring examples of this technology.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", for example", and like describe one or more examples but are not limited to the described example/s; the terms "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" (also referred to as a "client device") refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system", "server computer system", "server device" or "server apparatus") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is a server may include a first server computing device and a second server computing device, which may provide the same or different functionality to the same or different set of clients.

As used herein, the term "website" may refer to a collection of web pages, web resources, and other web content made available over the Internet. For example, a first website may include web content hosted by a web server system, such as a first server device, while a second website may include web content hosted by a second web server system, such as a second web server device. Often, the web content of a website shares a single domain name or set of related domain names that are owned or controlled by a common entity. A website may include web page content accessible over the Internet through a browser, and/or web content that is accessible over the Internet from another client application. Such applications may include web applications executing in a browser(s) and/or native application(s) installed on client computing devices (also referred to as "client devices").

General Overview

This document generally describes systems, methods, devices, and other exemplary implementations of encrypted interstitial techniques for web security. In response to transmitting a request for a webpage having a protected resource to a server device, an interstitial page is served to a client device. The interstitial page includes an encrypted portion that includes an encrypted copy of the webpage, an unencrypted portion that includes one or more link tags that correspond to one or more sub-resources included in the webpage, and instrumentation code that collects telemetry data at the client device. A threat analysis is performed on the telemetry data to determine whether the request is from a potential attacker. Concurrently to the collection of telemetry data and the performance of the threat analysis, the client device can download the one or more sub-resources to its cache as well as the encrypted webpage. Based on the performed threat analysis, a determination is made as to whether the client device should be allowed to access the requested webpage. In the case where it is determined that the client device should be allowed to access the requested webpage, a decryption key is sent to the client device, which allows the client device to decrypt the previously downloaded encrypted webpage for rendering by the client device within the interstitial page.

The threat analysis may be tailored to detect particular types of potential attackers. For example, the threat analysis may be configured to determine whether the request at the client computing device is initiated by a human user or automated software. In some examples, the threat analysis is configured to detect whether the request is part of an attack of one or more types. For example, the threat analysis may detect whether the request is likely for scraping protected content. In some examples, the encrypted interstitial techniques described herein are used to implement an invisible challenge to protect the protected resource from automated access without creating undue user friction for a legitimate user.

The interstitial page may be provided in a manner that does not require a redirect in a browser application at the client computing device. For example, after an interstitial page is used to collect telemetry data that passes the threat analysis, the protected content may be written into the interstitial page. When the protected content is written into the interstitial page, a browsing history at the client computing device will include a single visit to the protected resource. In some examples, the web server system will also reflect a single visit from the client computing device to the protected resource.

The various exemplary techniques described herein may for example achieve one or more of the following advantages: a web content provider may reduce user friction for legitimate users; in particular, the web content provider may reduce negative impacts caused by increased user friction such as decreased usage and/or incomplete transactions; the web content provider may better protect its users and itself from fraudsters; such features may be provided relatively simply for the web content providers in certain implementations; in particular implementations, such features can be added with minimal modification by the web content provider to hardware or software on its own server systems; security code and/or systems can be provided flexibly by an organization that specializes in web security, which can in turn keep the security code updated to address ever-changing security threats; such a security organization can also aggregate data received across many entities that operate many domains, including telemetry data and/or analyzed telemetry data; such a security organization can use such aggregated data to generate countermeasures that are more effective than countermeasures that could be developed using only data from a single domain; the use of an encrypted interstitial page can enhance the user experience by further reducing friction for users by reducing or eliminating delays associated with collecting telemetry data and performing the threat analysis by allowing the client device to download a majority or all of the requested webpage content prior to a determination being made that the client device is authorized to access the content. Additional features and advantages are apparent from the examples of this technology illustrated and described herein.

System Overview

Referring to FIG. 1, a block diagram of an example of computer system 100 that includes an example of a security server system 140 is illustrated. The computer system 100 includes at least one client computing device 102, at least one web server system 112, and the security server system 140, although the system could include other types and/or numbers of other systems, devices, components, and/or other elements in other configurations. The client computing device 102, the web server system 112 and the security server system 140 communicate over one or more networks 150. The network/s 150 may include one or more local area networks (LANs) and/or one or more wide area networks, such as the Internet. The network arrangement and connectivity between the client computing device 102, the web server system 112 and the security server system 140 in this and other examples may vary.

In this example, the web server system 112 hosts web content 122, making the web content 122 available to the client computing device 102. For example, the web content 122 may include one or more web pages, images, audio, video, messages, files, data, scripts, services, application content, and other content available over the network/s 150, although other types of content or other data and/or instructions may be stored. In some examples, the web content 122 includes any data, instructions, or other content provided by the web server system 112 over the network(s), such as a response to a request from the client computing device 102.

The security server system 140 may implement one or more encrypted interstitial techniques for web security as illustrated and described by way of the examples herein. In some examples, the security server system 140 includes an instrumentation code component 132, a telemetry processing component 134, a telemetry database component 138, and an interstitial page creation component 136 although the security server system 140 may comprise other types and/or numbers of components and/or other elements.

The security server system 140 and/or its components (e.g., instrumentation code component 132, telemetry processing component 134, interstitial page creation component 136 and/or telemetry database component 138) as described by way of the example herein are presented as individual components for ease of explanation. Any action performed by or to one or more components of the security server system 140 may in these examples be considered performed by or to the security server system 140. The security server system 140 and/or its components may be implemented as one or more dependent or independent processes and may be implemented on one or multiple computers. For example, a component may be implemented as a distributed system. Alternatively and/or in addition, multiple instances of one or more components may be implemented. Furthermore, a component shown may be implemented fully and/or partially in one or multiple programs and/or processes, and two or more components shown may be implemented fully and/or partially in the same program and/or process.

Protected Resource

The security server system 140 may use interstitial techniques to secure a protected resource in the web content 122 hosted by the web server system 112. In some examples, the security server system 140 uses one or more encrypted interstitial techniques described by way of the examples herein to protect a web resource referenced by a particular Uniform Resource Locator (URL) when the client computing device 102 requests the protected resource.

A request for a protected resource may, for example, be initiated by a browser application 106 executing on the client computing device 102. As used herein, the term "browser application" refers to any client application that interacts with web servers over the Internet or other network, such as by sending requests and receiving responses using the HTTP or other protocol. A browser application may include a stand-alone browser for execution on a computing device, a mobile browser for execution on a mobile computing device, a native application on a computing device, such as, but not limited to, a mobile computing device, an in-app browser that is integrated into another application, a web crawler application, a headless browser, other automated bots and/or other automated software, and any other software application that interacts with web servers over the Internet or other network.

Instrumentation Code

In this example, the instrumentation code component 132 provides instrumentation code to collect telemetry data about particular signals at the client computing device 102. As used herein, the term "instrumentation code" refers to source code, bytecode, binary software, or other code that is executed on a computer to collect data at the computer. For example, instrumentation code may be JavaScript that collects and/or otherwise generates data on a computing device 102 and sends that data, referred to as telemetry data, to a server such as security server system 140.

In some examples, the instrumentation code may include instructions to send collected telemetry data to a server, such as security server system 140 by way of example, over one or more requests or transactions. For example, the instrumentation code may, when executed at the client computing device 102, execute an XML HTTP Request (XHR) that provides the telemetry data to the security server system 140. The security server system 140 may receive the telemetry data directly from the client computing device 102 or indirectly via one or more other computers or other systems.

In some examples, the instrumentation code component 132 provides instrumentation code to the client computing device 102 when the client computing device 102 interacts with the web server system 112. For example, the instrumentation code component 132 may provide instrumentation code for execution at the client computing device 102 when the client computing device 102 requests the web content 122 from the web server system 112, such as but not limited to protected content.

In some examples, the security server system 140 provides instrumentation code to collect telemetry data during one or more particular interaction types. For example, the instrumentation code component 132 may provide instrumentation code to the client computing device 102 when the client computing device 102 requests to log in to the web server system 112.

The instrumentation code may be provided in different formats. For example, the instrumentation code may include JavaScript code, and/or other web code that executes in a browser or other JavaScript engine at the client computing device 102. In some examples, the instrumentation code may include bytecode, such as JavaScript bytecode.

In some examples, the instrumentation code component 132 provides different instrumentation code in different situations. For example, the instrumentation code component 132 may provide different instrumentation code to clients of different web server systems. In some examples, the instrumentation code component 132 provides different instrumentation code for different client computing devices. For example, different instrumentation code may be provided when client computing devices are running different browsers, operating systems, or other software (including different versions thereof), or when the security server system 140 determines that client computing device or devices pose a different amount or type of security risk.

Telemetry Data

The telemetry processing component 134 may receive and process telemetry data collected at the client computing device 102. In some examples, the telemetry processing component 134 maintains a telemetry data set that includes telemetry data collected for a plurality of interactions between the client computing device 102 and the web server system 112. For example, the telemetry processing component 134 may store the telemetry data set in a telemetry database component 138 that is accessible to other components of the security server system 140 to implement encrypted interstitial techniques, although the telemetry data may be stored at other locations.

The instrumentation code may collect telemetry data at the client computing device 102. As used herein, the term "signal" refers to an object used to convey telemetry data, such as a particular property and/or aspect of: a computing environment at one or more of the client computing device 102, one or more operating states of the client computing device 102, one or more operations performed at the client computing device 102, and user interaction at the client computing device 102, although other types of signals and/or other properties and/or aspects at the client computing device 102 may be collected. As used herein, the term "signal value" refers to a value for a signal (e.g. the specific type of data) at the client computing device 102, as detected by the instrumentation code. For example, a signal may be an IP address, while a signal value collected at the client computing device 102 is the IP address of the client computing device 102 (e.g. 123.456.78.9). Other signals may include network properties, operating system properties, browser properties, installed software properties, display size, other hardware properties, device configuration properties, information about execution of web code or other web content, information about processing of web content, information about human or software interactions with the web content, information about user inputs at the client computing device 102, and other signals that are collectable when the instrumentation code is executed at the client computing device 102. In some examples, a different number of signals may be collected for different transactions.

Threat Analysis

In this example, a threat analysis may be performed on the telemetry data to determine whether the request is from a potential attacker. Based on an outcome of the threat analysis, an interstitial cookie may be set at the client computing device 102 that allows future requests without performance of the threat analysis. A valid interstitial cookie at the client computing device 102 may allow a subsequent request from that the client computing device 102 to be processed without collecting additional telemetry data in association with the subsequent request and/or performing a threat analysis on the additional telemetry data. For example, the request may be automatically forwarded to the exemplary web server system 112 without collecting telemetry data using an interstitial page. Additionally, sufficient information about the original client request may in some examples be included in the subsequent response (with the interstitial page) and request (the telemetry) for the server to fully reconstruct the original client request which provides transparency.

In this example, the threat analysis may be tailored to detect particular types of potential attackers. For example, the threat analysis may be configured to determine whether the request at the client computing device 102 is initiated by a human user or automated software. In some examples, the threat analysis is configured to detect whether the request is part of an attack of one or more types. For example, the threat analysis may detect whether the request is likely for scraping protected content. In some examples, the encrypted interstitial techniques described herein are used to implement an invisible challenge to protect the protected resource from automated access without creating undue user friction for a legitimate user.

The threat analysis may evaluate telemetry data collected on one or more signals. For example, the threat analysis may determine whether an IP address is associated with a higher security risk, such as a blacklisted Autonomous System Number (ASN) associated with automated browser activity. In some examples, the threat analysis may be configured to detect traffic generated by automated software so that requests generated by automated software will not pass the threat analysis.

Encrypted Interstitial Page

The interstitial page creation component 136 may create and provide an interstitial page to the client computing device 102 in response to receiving a request for a webpage that was sent from the client computing device 102 to the web server system 112. The interstitial page creation component 136 may fetch the Hypertext Markup Language (HTML) document that represents the requested webpage from the web server system 112 and generated an interstitial page based on the fetched HTML that includes an encrypted portion that can be downloaded but not read by the client computing device 102, an unencrypted portion that can be downloaded and read by the client computing device 102 and instrumentation code that can be downloaded and executed by the client computing device 102 to collect telemetry data.

The encrypted portion of the interstitial page may include an encrypted copy of the HTML code that represents the requested webpage. In some examples, the interstitial page creation component may encrypt a copy of the HTML of the requested website that is received from the web server system 112 using symmetric key encryption. As will be understood by those of skill in the art, the encrypted webpage may then be decrypted by a device that has a copy of the encryption key used to encrypt the webpage.

The unencrypted portion of the interstitial page may include one or more link tags that are generated by the interstitial page creation component 136. The link tags may be generated by scanning the fetched HTML code of the requested webpage to identify one or more sub-resource links that exist in the fetched HTML. As will be appreciated by those of skill in the art, HTML code for a webpage may commonly include links to sub-resources, which are resources (e.g., images, videos, style sheets, javascript, etc.) that can be fetched from other storage locations. According to some implementations, the sub-resources may be hosted by one or more third parties and may be made up of information that does not need to be protected.

For example, an airline hosting a website that provides valuable information such as the availability, times, locations and prices of flights may want to prevent a web scraper from automatically obtaining this valuable commercial information but may have no interest in protecting other elements of the webpage that may be provided as a link to a sub-resource within the HTML code, such as for example, generic images of planes or airports, a flight safety video, local weather information provided by a third party, and the like. Thus, the interstitial page creation component 136 may search through the HTML code of the webpage to identify links to sub-resources, generate a link tag for each of the identified sub-resources by copying each link to a sub-resource into the unencrypted portion of the interstitial page and associating each copied link with a preload attribute (e.g., a rel="preload"). As will be understood by those of skill in the art, a preload attribute, when read by the client computing device 102, will cause the client computing device 102 to automatically begin loading or downloading the linked content. Thus, when the interstitial page is served to the client computing device 102, the client computing device 102 will read the link tags, which will cause the client computing device 102 to automatically begin downloading the linked resources to the cache of the client computing device 102. Although link tags are described as being a mechanism to cause the client computing device 102 to automatically being loading or downloading sub-resources linked in the HTML code of the requested web page, it should be understood that in other examples other mechanisms known in the art can be used to perform this function, such as for example, Link HTTP response headers or other such mechanisms for referencing one or more sub-resources included in the webpage. Thus, although some examples describe including a link tag in the unencrypted portion of the interstitial page, in other examples the unencrypted portion of the interstitial page may include Link HTTP response headers. More generally, the unencrypted portion of the interstitial page may include any type of link element that serves to provide a link to a sub-resource and cause the client computing device 102 to automatically begin downloading and caching the linked sub-resource.

Example Method

Referring to FIG. 2, a flow chart of an example of a method for using encrypted interstitial techniques for web security is illustrated. In this example, the method 200 may be performed by one or more computing devices and/or processes thereof. For example, one or more steps of method 200 may be performed by a computer system, such as but not limited to computer system 400. In some examples, one or more steps of method 200 are performed by a security server system, which may include one or more defense server systems, companion server systems, and/or analysis server systems. Method 200 will be described with respect to security server system 140, but is not limited to performance by such and may be used with other types of security server systems.

At step 202, the security server system 140 intercepts (or otherwise receives) a request for a webpage that includes a protected resource. The request may be a request sent from a client computing device (e.g. client computing device 102, which may also be referred to as a "client device") to a web server system (e.g. web server system 112, which may also be referred to as a "server device"). In some examples, the request is a GET request to obtain web content (e.g. web content 122) from the web server system 112. The web content may include one or more protected resources, although other types of content may be requested. In some examples, the security server system 140 may intercept the request before it reaches the web server system 112. For example, the security server system 140 may act as a reverse proxy server to the web server system and intercept the request. In some examples, the web server system 112 may receive the request and forward it to the security server system 140 and await instructions from the security server system 140 before responding to the request.

At step 204, the security server system 140 may generate one or more link tags for a corresponding one or more sub-resources included in the webpage. A link tag is a feature of HyperText Markup Language (HTML) that can provide a link to a sub-resource that can be accessed and downloaded using the link. The link tags can have an associated preload attribute that, when read by a device, will cause the device to automatically begin downloading the linked sub-resource to its cache.

In some examples, the security server system 140 may generate the one or more link tags by scanning the HTML code of the requested webpage to identify one or more sub-resource tags and for each identified sub-resource tag, generate a link tag that is associated with a preload attribute. The security server system 140 may either access the HTML code for the requested webpage on the web server system 112 and/or receive a copy of the HTML code of the requested webpage and scan the received HTML code for the link tags.

At step 206, the security server system 140 may generate an encrypted webpage by encrypting the webpage. In some examples, the security server system 140 may encrypt the webpage (i.e., a copy of the HTML of the requested webpage) using symmetric key encryption.

At step 208, the security server system 140 may serve an interstitial page to the client computing device. The interstitial page includes an encrypted portion, an unencrypted portion and instrumentation code that, when executed at the requesting client computing device 102, collects telemetry data. The encrypted portion of the interstitial page includes the encrypted webpage. The unencrypted portion of the interstitial page includes the one or more link tags.

The unencrypted portion including the one or more link tags may be configured to allow the client computing device 102 to download the corresponding one or more sub-resources to a cache of the client computing device 102 while the telemetry data is being collected and the threat analysis is being performed. Thus, the client computing device 102 may begin downloading the sub-resources based on the provided link tags and the encrypted copy of the webpage (i.e., the encrypted copy of the HTML code representing the webpage) while the instrumentation code executes to gather telemetry data and the security server system 140 operates to make a threat determination.

At step 210, the security server system 140 receives the telemetry data from the requesting client computing device 102.

At step 212, the security server system 140 performs threat analysis on the telemetry data collected in association with the request. For example, the threat analysis may be configured to detect traffic generated by automated software ("bots") so that requests generated by automated software will not pass the threat analysis.

At step 214, the security server system 140 in this example transmits a decryption key to the client computing device 102 in response to determining, based on the performed threat analysis, that the request is allowed. The decryption key is configured to allow the client computing device 102 to decrypt the encrypted webpage. Thus, upon receiving the decryption key, the client computing device 102 may quickly decrypt the previously download encrypted copy of the HTML code of the requested webpage and render the webpage. As will be appreciated by those of skill in the art, because the client computing device 102 had already started and possibly completed the process of downloading the sub-resources and encrypted copy of the HTML prior to the security server system 140 determining that the client computing device 102 is allowed to access the requested content, by the time the security server system 140 makes that determination and authorizes the client computing device 102 to access the webpage, the client computing device 102 will be able to render the webpage very quickly as the majority or all of the necessary data required to load it has already been previously downloaded by the client computing device 102.

In some examples, the method 200 may further include performing a mitigating action with respect to the request in response to determining, based on the performed threat analysis, that the request is (or should be) denied. For example, the security server system 140 may deny the client computing device 102 access to the requested webpage and/or add the client computing device 102 to a blacklist.

Example System Architecture

A security server system (e.g. security server system 140) may include one or more server systems that provide instrumentation code to client computing devices (e.g. client computing device 102) and process telemetry data received from the client computing devices when the instrumentation code executes on the client computing devices.

Figure 3:
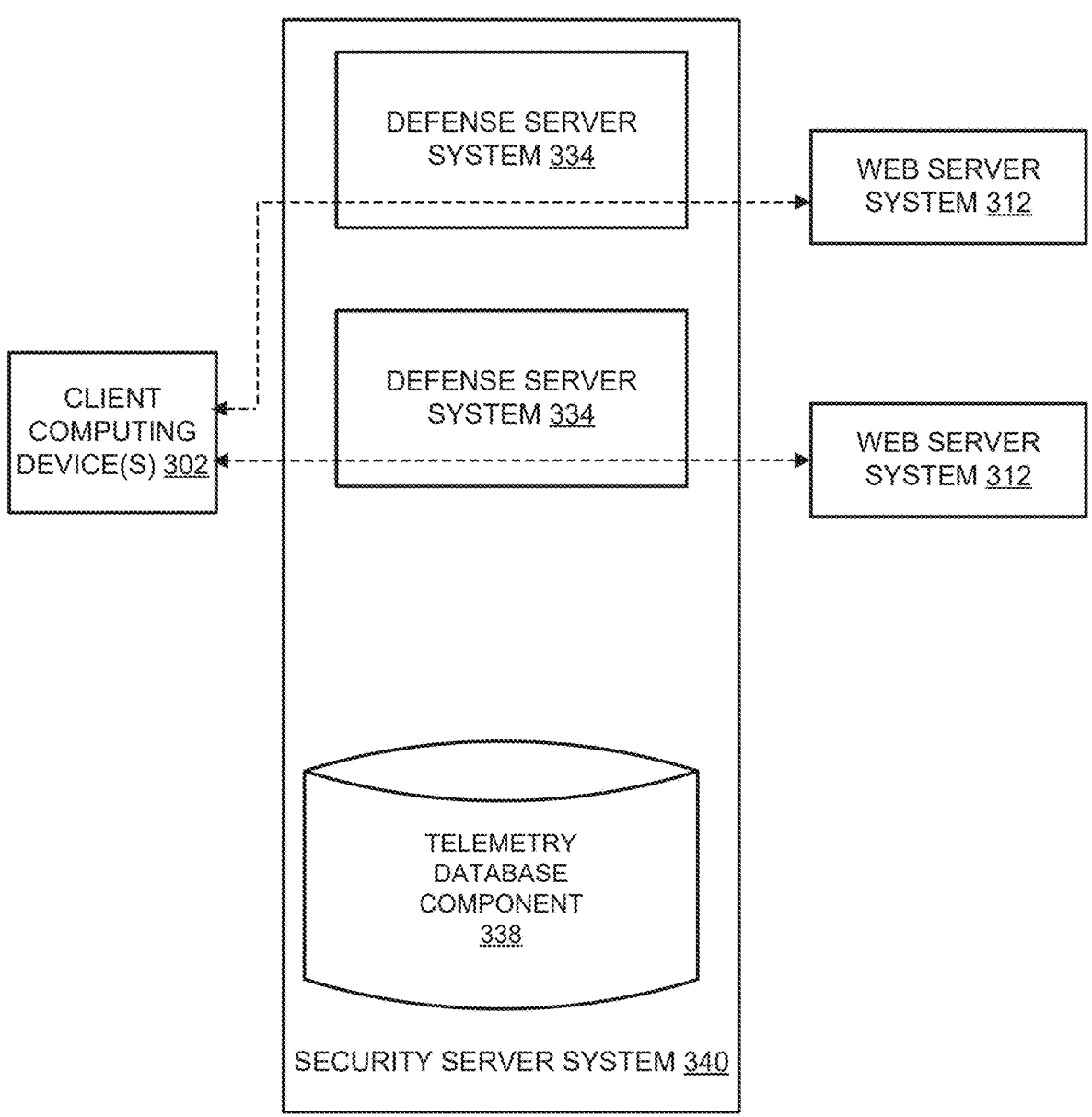
FIG. 3 is a block diagram of an example of another security system that includes a security server system.

Referring to FIG. 3, a block diagram of an example of a computer system that includes a security server system 340 is illustrated. In this example, the security server system 340 that implements interstitial techniques to protect one or more web server systems 312-314 when one or more client computing devices 302 interact with web content hosted by the web server systems 312-314. In some examples, the security server system 140 as illustrated and described in the examples in FIG. 1 may be the same in structure and operation as the security server system 340 in FIG. 3.

The security server system 340 may include one or more defense server systems 332-334. In this example, a defense server system 332-334 is associated with one or more web server systems 312-314. The defense server system 332-334 may perform actions relating to transactions and/or other interactions between client computing device(s) 302 and the associated web server system(s) 312-314. A defense server system 332 that is associated with a particular web server system 312 may perform one or more actions during interactions between client computing device 302 and the particular web server system 312.

For example, when client computing device(s) 302 interact with a particular web server system 312 associated with a particular defense server system 332, the defense server system 332 provides instrumentation code to the client computing device(s) 302 and processes telemetry data collected at the client computing device(s) 302 when the corresponding instrumentation code executes at the client computing device(s) 302. The defense server system 332 may store telemetry data corresponding to the interactions in a telemetry database component 338 of the security server system 340. The data stored in the telemetry database component 338 may be available across the security server system 340. For example, another defense server system 334 may use the telemetry database component 338 collected based on interactions with the one web server system 312 to protect a second web server system 314.

A defense server system 332-334 may be positioned in different network configurations with respect to the client computing device(s) 302 and an associated web server system 312-314. For example, a defense server system 332-334 may be deployed in an in-line configuration, an out-of-band configuration, or another configuration that allows the defense server system 332-334 to perform actions relating to transactions and/or other interactions as they occur between client computing device(s) 302 and one or more web server systems 312-314.

In an in-line configuration, a defense server system 332-334 may act as a reverse proxy server to an associated web server system 312-314 by intercepting one or more communications between the client computing device(s) 302 and the associated web server system 312-314. As a reverse proxy server, the defense server system 332-334 retrieves resources, such as web content, on behalf of clients at client computing device(s) 302 of the associated web server systems 312-314. To the client computing device(s) 302, the resources appear to originate from the associated web server system 312-314. The defense server system 332-334 may be deployed locally to the web server system 312-314 or deployed over the Internet with respect to the web server system 312-314, such as in a cloud computing system managed by a security company, and/or in a computer system operated by a security company. For example, the defense server system 332-334 may intercept messages to the client computing device(s) 302 and add instrumentation code for execution at the client computing device(s) 302. As another example, the defense server system 332-334 may intercept requests to the associated web server system 312-314 that include collected telemetry data from the client computing device(s) 302, process the telemetry data, and forward the requests to the associated web server system 312-314.

In an out-of-band configuration, a defense server system 332-334 may be involved in transactions and/or other interactions without intercepting communications between the client computing device(s) 302 and the associated web server system 312-314. For example, a web server system 312-314 may obtain instrumentation code from the corresponding defense server system 332-334, provide the instrumentation code to the client computing device(s) 302, receive telemetry data generated at the client computing device(s) 302, and/or provide the corresponding defense server system 332-334 the telemetry data received from the client computing device(s) 302.

Implementing Security Countermeasures

In some examples, the security server system 340 is operated by a security company or another entity that provides web security services. One or more web server systems 312-314 may be operated by security service customers, or entities that are provided security services by the security company. The security server system 340 may protect the web server systems 312-314 of security service customers from attacks, such as attacks by malicious automated software executing on one or more client computing devices 302.

In some examples, the defense server systems 332-334 may analyze transactions and/or other interactions between the client computing devices 302 and the associated web server systems 312-314 to detect and mitigate attacks on the associated web server systems 312-314. For example, a defense server system 332-334 may collect and evaluate telemetry data corresponding to a transaction to determine whether the transaction is involved in an attack, such as whether a client computing device 302 involved in the transaction is controlled by automated malicious software. The defense server systems 332-334 may analyze telemetry data for an interaction to prevent an attack in real time, such as by such as blocking, redirecting, or flagging communications that correspond to the interaction.

When analyzing telemetry data to provide security services, the defense server systems 332-334 may store the telemetry data in the telemetry database component 338. Telemetry data stored in the telemetry database component 338, including any telemetry data collected to implement security services, is available for implementing encrypted interstitial techniques. In some examples, telemetry data stored in the telemetry database component 338, including any telemetry data collected to implementing encrypted interstitial techniques, is available for security analysis, such as by the security analysis server system 338.

The security server system 340 may include a security analysis server system 338 that evaluates telemetry data collected at the client computing device(s) 302 to detect signatures or other properties of transactions initiated by malicious software executing on the client computing device(s) 302. The security analysis server system 338 may use the telemetry data set to learn about new attacks and/or to deploy new countermeasures for real-time attack detection and prevention. For example, the security analysis server system 338 may update the defense server systems 332-334 with the new countermeasures so that the defense server systems 332-334 may use the new security countermeasures to process transactions between associated web server systems 312-314 and client computing device(s) 302 in real time.

Setting Interstitial Cookies at Other Times

In some examples, an interstitial cookie is set at a client-side browser application 106 based on telemetry data collected at another point in time. For example, a defense server system 332-334 may add instrumentation code to, or otherwise integrate instrumentation code with web content served by the associated web server system 312-314, such as for another security purpose. For example, a defense server system 332-334 may provide instrumentation code for one or more specific transaction types, such as login transactions, other authentication transactions, purchase transactions, financial transactions, data submission, account creation, and/or other transaction types.

The instrumentation code provided for the other security purpose may collect a more comprehensive set of telemetry data in some examples. For example, a defense server system 332-334 may add instrumentation code to a login page. When a user is expected to enter his/her credentials on the login page, the instrumentation code may execute in the background to collect the more comprehensive set of telemetry data. When the user submits the login request, the telemetry data collected by the instrumentation code may be submitted with the login request so that the telemetry data may be used to evaluate and/or secure the login request.

In some examples, a security server system 340 may performs a threat analysis on the telemetry data collected in the background for another security purpose. Based on the threat analysis, the security server system 340 may determine whether or not to set an interstitial cookie at a client computing device 302 for later use when the client computing device 302 requests a protected resource, although this method may work for other types of content that is requested.

Implementation Mechanisms—Hardware Overview

According to one example, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 4:
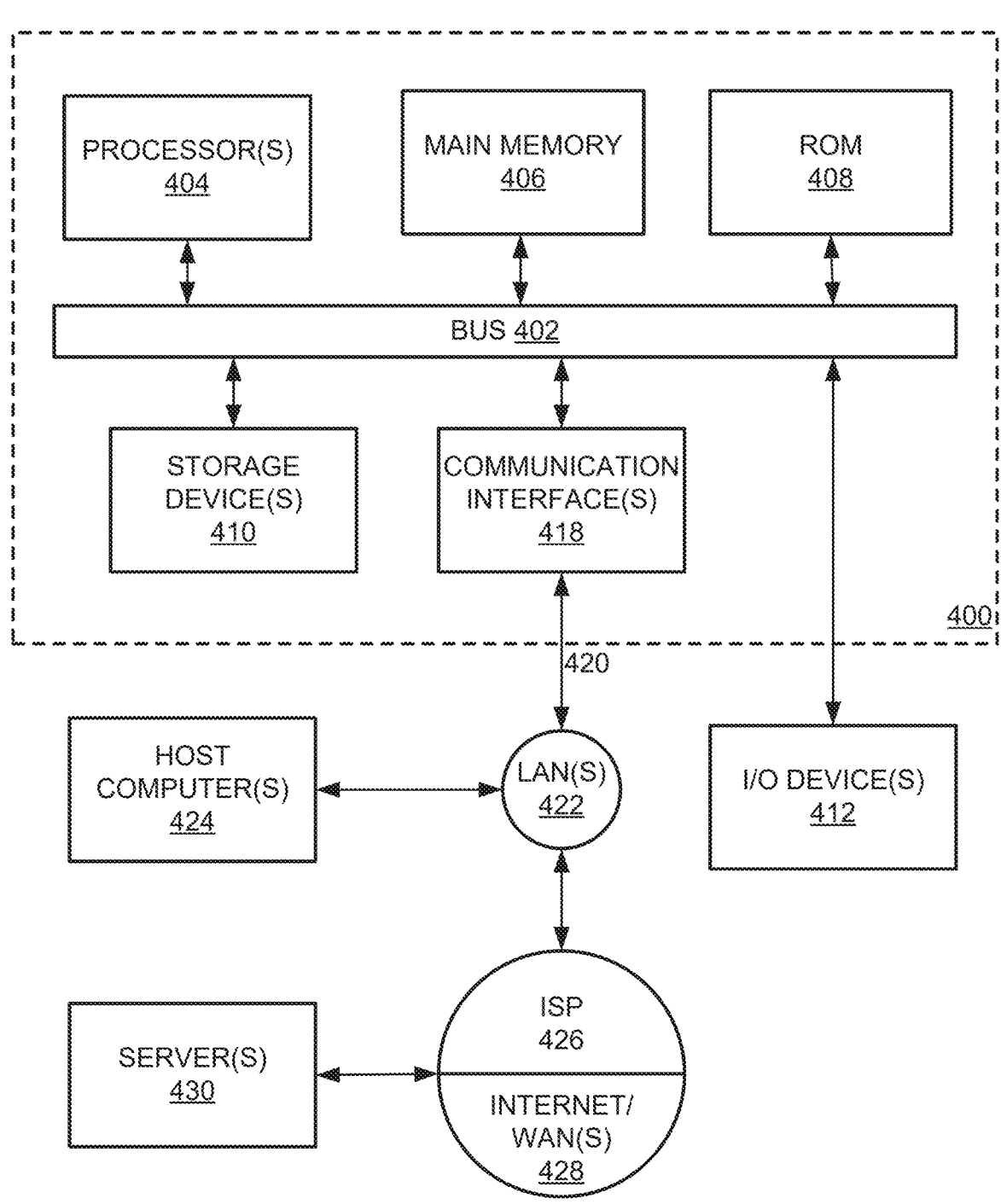
FIG. 4 is a block diagram of an example computer system upon which one or more examples of this technology may be implemented.

Referring to FIG. 4, a block diagram of a computer system upon which this technology may be implemented as illustrated by way of the examples herein. Computer system 400 may include a bus 402 or other communication mechanism for communicating information, and one or more hardware processors 404 coupled with bus 402 for processing information, such as basic computer instructions and data. Hardware processor(s) 404 may include, for example, one or more general-purpose microprocessors, graphical processing units (GPUs), coprocessors, central processing units (CPUs), and/or other hardware processing units.

Computer system 400 may also include one or more units of main memory 406 coupled to bus 402, such as random access memory (RAM) or other dynamic storage, for storing information and instructions to be executed by processor(s) 404. Main memory 406 may also be used for storing temporary variables or other intermediate information during execution of instructions to be executed by processor(s) 404. Such instructions, when stored in non-transitory storage media accessible to processor(s) 404, turn computer system 400 into a special-purpose machine that is customized to perform the operations specified in the instructions. In some examples, main memory 406 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 400 may further include one or more units of read-only memory (ROM) 408 or other static storage coupled to bus 402 for storing information and instructions for processor(s) 404 that are either always static or static in normal operation but reprogrammable. For example, ROM 408 may store firmware for computer system 400. ROM 408 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 410, such as a magnetic disk or optical disk, is provided and coupled to bus 402 for storing information and/or instructions. Storage device(s) 410 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 400 may be coupled via bus 402 to one or more input/output (I/O) devices 412. For example, I/O device(s) 412 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 412 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 404 and for controlling cursor movement on another I/O device (e.g., a display). This input device typically has at degrees of freedom in two or more axes, (e.g. a first axis x, a second axis y, and optionally one or more additional axes z . . . ), that allows the device to specify positions in a plane. In some examples, the one or more I/O device(s) 412 may include a device with combined I/O functionality, such as a touch-enabled display.

Other I/O device(s) 412 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor(s) 404 over bus 402.

Computer system 400 may implement the techniques described herein using customized hard-wired logic, one or more ASICs or FPGAs, firmware or program logic which, in combination with the computer system causes or programs, causes computer system 400 to be a special-purpose machine. According to one example, the techniques herein are performed by computer system 400 in response to processor(s) 404 executing one or more sequences of one or more instructions contained in main memory 406. Such instructions may be read into main memory 406 from another storage medium, such as one or more storage device(s) 410. Execution of the sequences of instructions contained in main memory 406 causes processor(s) 404 to perform the method steps described herein. In alternative examples, hard-wired circuitry may be used in place of or in combination with software instructions.

Computer system 400 may also include one or more communication interfaces 418 coupled to bus 402. Communication interface(s) 418 provide two-way data communication over one or more physical or wireless network links 420 that are connected to a local network 422 and/or a wide area network (WAN), such as the Internet. For example, communication interface(s) 418 may include an integrated services digital network (ISDN) card, cable modem, satellite modem, or a modem to provide a data communication connection to a corresponding type of telephone line. Alternatively and/or in addition, communication interface(s) 418 may include one or more of: a local area network (LAN) device that provides a data communication connection to a compatible local network 422; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 428); and other networking devices that establish a communication channel between computer system 400 and one or more LANs 422 and/or WANs.

Network link(s) 420 typically provides data communication through one or more networks to other data devices. For example, network link(s) 420 may provide a connection through one or more local area networks 422 (LANs) to one or more host computers 424 or to data equipment operated by an Internet Service Provider (ISP) 426. ISP 426 in turn provides connectivity to one or more wide area networks 428, such as the Internet. LAN(s) 422 and WAN(s) 428 both use electrical, electromagnetic or optical signals that carry digital data streams. The signals through the various networks and the signals on network link(s) 420 and through communication interface(s) 418 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its main memory 406 and send the instructions over a telecommunications line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 can send messages and receive data, including program code, through the network(s), network link 420 and communication interface 418. In the Internet example, one or more servers 430 might transmit signals corresponding to data or instructions requested for an application program executed by the computer system 400 through the Internet 428, ISP 426, local network 422 and a communication interface 418. The received signals may include instructions and/or information for execution and/or processing by processor(s) 404. Processor(s) 404 may execute and/or process the instructions and/or information upon receiving the signals by accessing main memory 406, or at a later time by storing them and then accessing them from storage device(s) 410.

Other Aspects of Disclosure

In the foregoing specification, examples of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, implemented by a security server system, for using an encrypted interstitial page, the method comprising:
    intercepting a request for a webpage comprising a protected resource, wherein the request is sent from a client device to a server device;
    generating one or more linking mechanisms for referencing a corresponding one or more sub-resources included in the webpage;
    encrypting the webpage, thereby generating an encrypted webpage;
    serving an interstitial page to the client device, the interstitial page comprising:
        an encrypted portion comprising the encrypted webpage;
        an unencrypted portion comprising the one or more linking mechanisms, wherein the one or more linking mechanisms are configured to cause the client device to download the corresponding one or more sub-resources while telemetry data is being collected; and
        instrumentation code that, when executed at the client device, collects the telemetry data;
    receiving the telemetry data from the client device;
    performing a threat analysis on the telemetry data collected in association with the request; and
    responsive to determining, based on the performed threat analysis, that the request is allowed, transmitting a decryption key to the client device, wherein the decryption key is configured to allow the client device to decrypt the encrypted webpage.

2. The method of claim 1, wherein the generating of one or more linking mechanisms for referencing a corresponding one or more sub-resources included in the webpage comprises:

scanning HTML code of the webpage to identify one or more sub-resource tags; and for each identified sub-resource tag, generating a link tag that is associated with a preload attribute.

3. The method of claim 2, wherein the unencrypted portion comprising the one or more linking mechanisms is configured to allow the client device to download the corresponding one or more sub-resources to a cache of the client device while the telemetry data is being collected and the threat analysis is being performed.

4. The method of claim 1, further comprising:

responsive to determining, based on the performed threat analysis, that the request is denied, performing a mitigating action with respect to the request.

5. The method of claim 1, wherein the encrypting of the webpage is performed using symmetric key encryption.

6. A security server device comprising:

a memory comprising programmed instructions stored thereon; and one or more processors coupled to the memory and configured to execute the stored programmed instructions to:

intercept a request for a webpage comprising a protected resource, wherein the request is sent from a client device to a server device;

generate one or more linking mechanisms for referencing a corresponding one or more sub-resources included in the webpage;

encrypt the webpage to thereby generate an encrypted webpage;

serve an interstitial page to the client device, the interstitial page comprising:

an encrypted portion comprising the encrypted webpage;

an unencrypted portion comprising the one or more linking mechanisms, wherein the one or more linking mechanisms are configured to cause the client device to download the corresponding one or more sub-resources while telemetry data is being collected; and instrumentation code that, when executed at the client device, collects the telemetry data;

receive the telemetry data from the client device;

perform a threat analysis on the telemetry data collected in association with the request; and responsive to determining, based on the performed threat analysis, that the request is allowed, transmit a decryption key to the client device, wherein the decryption key is configured to allow the client device to decrypt the encrypted webpage.

7. The device of claim 6, wherein for the generating of one or more linking mechanisms for referencing a corresponding one or more sub-resources included in the webpage, the one or more processors are further configured to execute the stored programmed instructions to:

scan HTML code of the webpage to identify one or more sub-resource tags; and for each identified sub-resource tag, generate a link tag that is associated with a preload attribute.

8. The device of claim 7, wherein the unencrypted portion comprising the one or more linking mechanisms is configured to allow the client device to download the corresponding one or more sub-resources to a cache of the client device while the telemetry data is being collected and the threat analysis is being performed.

9. The device of claim 6, wherein the one or more processors are further configured to execute the stored programmed instructions to:

responsive to determining, based on the performed threat analysis, that the request is denied, perform a mitigating action with respect to the request.

10. The device of claim 6, wherein the webpage is encrypted using symmetric key encryption.

11. A non-transitory computer readable medium having stored thereon instructions comprising executable code that, when executed by one or more processors, causes the one or more processors to:

intercept a request for a webpage comprising a protected resource, wherein the request is sent from a client device to a server device;

generate one or more linking mechanisms for referencing a corresponding one or more sub-resources included in the webpage;

encrypt the webpage to thereby generate an encrypted webpage;

serve an interstitial page to the client device, the interstitial page comprising:

an encrypted portion comprising the encrypted webpage;

an unencrypted portion comprising the one or more linking mechanisms, wherein the one or more linking mechanisms are configured to cause the client device to download the corresponding one or more sub-resources while telemetry data is being collected; and instrumentation code that, when executed at the client device, collects the telemetry data;

receive the telemetry data from the client device;

perform a threat analysis on the telemetry data collected in association with the request; and responsive to determining, based on the performed threat analysis, that the request is allowed, transmit a decryption key to the client device, wherein the decryption key is configured to allow the client device to decrypt the encrypted webpage.

12. The device of claim 11, wherein for the generating of one or more linking mechanisms for referencing a corresponding one or more sub-resources included in the webpage, the executable code, when executed by the one or more processors, further causes the one or more processors to:

scan HTML code of the webpage to identify one or more sub-resource tags; and for each identified sub-resource tag, generate a link tag that is associated with a preload attribute.

13. The non-transitory computer readable medium of claim 12, wherein the unencrypted portion comprising the one or more linking mechanisms is configured to allow the client device to download the corresponding one or more sub-resources to a cache of the client device while the telemetry data is being collected and the threat analysis is being performed.

14. The non-transitory computer readable medium of claim 11, wherein the executable code, when executed by the one or more processors further causes the one or more processors to:

responsive to determining, based on the performed threat analysis, that the request is denied, perform a mitigating action with respect to the request.

15. The non-transitory computer readable medium of claim 11, wherein the webpage is encrypted using symmetric key encryption.

16. A security system comprising one or more security server apparatuses, server devices, or client devices with memory comprising programmed instructions stored thereon and one or more processors coupled to the memory and configured to execute the stored programmed instructions to:

> intercept a request for a webpage comprising a protected resource, wherein the request is sent from a client device to a server device;
>
> generate one or more linking mechanisms for referencing a corresponding one or more sub-resources included in the webpage;
>
> encrypt the webpage to thereby generate an encrypted webpage;
>
> serve an interstitial page to the client device, the interstitial page comprising:
>
> > an encrypted portion comprising the encrypted webpage;
> >
> > an unencrypted portion comprising the one or more linking mechanisms, wherein the one or more linking mechanisms are configured to cause the client device to download the corresponding one or more sub-resources while telemetry data is being collected; and
> >
> > instrumentation code that, when executed at the client device, collects the telemetry data;
>
> receive the telemetry data from the client device;
>
> perform a threat analysis on the telemetry data collected in association with the request; and > responsive to determining, based on the performed threat analysis, that the request is allowed, transmit a decryption key to the client device, wherein the decryption key is configured to allow the client device to decrypt the encrypted webpage.

17. The system of claim 16, wherein for the generating of one or more linking mechanisms for referencing a corresponding one or more sub-resources included in the webpage, the one or more processors are further configured to execute the stored programmed instructions to:

> scan HTML code of the webpage to identify one or more sub-resource tags; and
>
> for each identified sub-resource tag, generate a link tag that is associated with a preload attribute.

18. The system of claim 17, wherein the unencrypted portion comprising the one or more linking mechanisms is configured to allow the client device to download the corresponding one or more sub-resources to a cache of the client device while the telemetry data is being collected and the threat analysis is being performed.

19. The system of claim 16, wherein the one or more processors are further configured to be capable of executing the stored programmed instructions to:

> responsive to determining, based on the performed threat analysis, that the request is denied, perform a mitigating action with respect to the request.

20. The system of claim 16, wherein the webpage is encrypted using symmetric key encryption.

* * * * *